United States Patent
Onaya et al.

(10) Patent No.: US 7,342,437 B2
(45) Date of Patent: Mar. 11, 2008

(54) CHARGE PUMP CIRCUIT

(75) Inventors: Yoshitaka Onaya, Gunma (JP); Tatsuya Suzuki, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 109 days.

(21) Appl. No.: 11/337,467

(22) Filed: Jan. 24, 2006

(65) Prior Publication Data

US 2006/0164156 A1 Jul. 27, 2006

(30) Foreign Application Priority Data

Jan. 24, 2005 (JP) ............................. 2005-015281

(51) Int. Cl.
*G05F 1/10* (2006.01)

(52) U.S. Cl. ........................ 327/536; 363/60

(58) Field of Classification Search ................. 327/536; 363/59, 60

See application file for complete search history.

(56) References Cited

U.S. PATENT DOCUMENTS

| | | | | |
|---|---|---|---|---|
| 5,280,420 A | * | 1/1994 | Rapp ........................... | 363/60 |
| 5,438,504 A | * | 8/1995 | Menegoli ..................... | 363/60 |
| 6,094,095 A | * | 7/2000 | Murray et al. .............. | 327/589 |
| 6,160,723 A | * | 12/2000 | Liu .............................. | 363/60 |
| 6,483,728 B1 | * | 11/2002 | Johnson et al. ............... | 363/60 |
| 6,720,822 B2 | * | 4/2004 | Torrisi et al. ................ | 327/536 |
| 6,747,897 B2 | * | 6/2004 | Karaki .................... | 365/185.18 |
| 6,781,440 B2 | * | 8/2004 | Huang ......................... | 327/537 |
| 7,005,912 B2 | * | 2/2006 | Nonaka ....................... | 327/536 |
| 7,023,260 B2 | * | 4/2006 | Thorp et al. ................ | 327/536 |
| 7,116,156 B2 | * | 10/2006 | Myono et al. .............. | 327/536 |
| 2001/0011919 A1 | * | 8/2001 | Tanimoto ..................... | 327/536 |
| 2007/0103225 A1 | * | 5/2007 | Tanimoto ..................... | 327/536 |

FOREIGN PATENT DOCUMENTS

| | | | |
|---|---|---|---|
| JP | 2001-231249 | | 8/2001 |
| JP | 2005102375 A | * | 4/2005 |

* cited by examiner

*Primary Examiner*—N. Drew Richards
*Assistant Examiner*—Thomas J. Hiltunen
(74) *Attorney, Agent, or Firm*—Morrison & Foerster LLP

(57) ABSTRACT

A size of a charge pump circuit is reduced as well as its cost. In a positive booster charge pump circuit in an embodiment of this invention, a positive boosted voltage 2VDD generated at its first stage node is used as a gate voltage to turn on a MOS transistor that outputs a high level (VDD) of each of the first, third and fourth clock drivers. And in a negative charge pump circuit, a negative boosted voltage −VDD generated at its first stage node is used as a gate voltage to turn on a MOS transistor that outputs a high level of each of the second and fifth clock drivers.

6 Claims, 7 Drawing Sheets

CHARGE PUMP CIRCUIT

CROSS-REFERENCE OF THE INVENTION

This invention is based on Japanese Patent Application No. 2005-015281, the content of which is incorporated herein by reference in its entirety.

BACKGROUND OF THE INVENTION

1. Field of the Invention

This invention relates to a charge pump circuit, specifically to a charge pump circuit having charge transfer devices, capacitors that are connected with the charge transfer devices through capacitive coupling and clock drivers that provide the capacitors with clocks.

2. Description of the Related Art

The charge pump circuit boosts a voltage by transferring charges corresponding to the clocks with pumping packets composed of the charge transfer devices such as diodes and the capacitors. The charge pump circuit is widely used as a power supply circuit and the like, and has an advantage over a switching regulator in eliminating a need for a coil as well as reducing a noise. In a charge pump circuit for a power supply to drive a CCD (Charge Coupled Device), for example, a positive voltage booster charge pump circuit and a negative voltage booster charge pump circuit are used since a positive high voltage and a negative high voltage are required.

FIG. 6 is a circuit diagram showing such a kind of charge pump circuit. Diodes D1-D4 are connected in series in a positive booster charge pump circuit 100. A power supply voltage VDD is applied to an anode of a diode D1 in a first stage. A first terminal of each of coupling capacitors C1-C3 is connected to each of connecting nodes between the diodes D1-D4, respectively.

A group of clock drivers 20 provides second terminals of the coupling capacitors C1-C3 with clocks in a way that the second terminals next to each other are provided with the clocks opposite in phase to each other. The group of drivers 20 is composed of first, second and third clock drivers 21, 22 and 23 and first, second and third delay circuits 24, 25 and 26. A clock CLK delayed by the first delay circuit 24 is applied to the second terminal of the coupling capacitor C1 through the first clock driver 21. A clock CLKB delayed by the second delay circuit 25 is applied to the second terminal of the coupling capacitor C2 through the second clock driver 22. The clock CLKB is opposite in phase to the clock CLK. The clock CLK delayed by the third delay circuit 26 is applied to the second terminal of the coupling capacitor C3 through the third clock driver 23.

A positive boosted voltage of 4VDD is obtained from a cathode of the diode D4 in a final stage as a first output voltage Vout1. The effect of threshold voltages of the diodes D1-D4 is neglected. Cout1 denotes a first output capacitor and L1 denotes a first load device to which an output current Iout1 of the first output voltage Vout1 from the positive booster charge pump circuit 100 is supplied.

Diodes D5-D7 are connected in series in a negative booster charge pump circuit 200. A ground voltage VSS (0V) is applied to a cathode of the diode D5 in a first stage. A first terminal of each of coupling capacitors C5 and C6 is connected to each of connecting nodes between the diodes D5-D7, respectively.

A group of clock drivers 30 provides second terminals of the coupling capacitors C5 and C6 with clocks in a way that the second terminals next to each other are provided with the clocks opposite in phase to each other. The group of clock drivers 30 is composed of fourth and fifth clock drivers 31 and 32 and fourth and fifth delay circuits 33 and 34. The clock CLK delayed by the fourth delay circuit 33 is applied to the second terminal of the coupling capacitor C5 through the fourth clock driver 31. The clock CLKB delayed by the fifth delay circuit 34 is applied to the second terminal of the coupling capacitor C6 through the fifth clock driver 32.

A negative boosted voltage of −2VDD is obtained from an anode of the diode D7 in a final stage as a second output voltage Vout2. The effect of threshold voltages of the diodes D5-D7 is neglected. Cout2 denotes a second output capacitor and L2 denotes a second load device to which an output current Iout2 of the second output voltage Vout2 from the negative booster charge pump circuit 200 is supplied.

FIG. 7 is a circuit diagram showing the first clock driver 21 and the first delay circuit 24. The first clock driver 21 is composed of a P-channel type MOS transistor 211 and an N-channel type MOS transistor 212 connected between the power supply voltage VDD and the ground voltage VSS. A connecting node between the P-channel type MOS transistor 211 and the N-channel type MOS transistor 212 makes an output terminal OUT.

The first delay circuit 24 is composed of a first inverter chain 241 made of three inverters connected in series, a second inverter chain 242 and a third inverter chain 243, both of which receive an output of the first inverter chain 241. The power supply voltage VDD and the ground voltage VSS are provided as power supplies to each of inverters constituting these inverter chains.

The clock CLK is supplied to an input terminal IN of the first inverter chain 241. An output of the second inverter chain 242 is applied to a gate of the P-channel type MOS transistor 211, while an output of the third inverter chain 243 is applied to a gate of the N-channel type MOS transistor 212. The second inverter chain 242 is designed so as to output a low level (the ground voltage VSS) slower than the third inverter chain 243. On the other hand, the third inverter chain 243 is designed so as to output a high level (the power supply voltage VDD) slower than the second inverter chain 242. Simultaneous turning on of the P-channel type MOS transistor 211 and the N-channel type MOS transistor 212 of the first clock driver 21 and resulting through-current are prevented from occurring by the design.

The second through fifth clock drivers 22, 23, 31 and 32 and the second through fifth delay circuits 25, 26, 33 and 34 are configured similarly.

The technology mentioned above is disclosed in Japanese Patent Application Publication No. 2001-231249, for example.

Since the first delay circuit 24 operates with the power supply voltage VDD and the ground voltage VSS, however, a voltage between the gate and a source of each of the MOS transistors in the first clock driver 21 when it is turned on is VDD at the most. There arises a problem, especially with the P-channel type MOS transistor 211, that a size of the transistor becomes very large in order to reduce an ON-resistance of the transistor.

SUMMARY OF THE INVENTION

A charge pump circuit of this invention includes a plurality of charge transfer devices connected in series, a plurality of capacitors each with a first terminal connected with each of connecting nodes between the plurality of charge transfer devices respectively and a plurality of clock drivers that provide second terminals of the plurality of capacitors with clocks in a way that the second terminals next to each other are provided with the clocks opposite in phase to each other, wherein a boosted voltage generated at one of the connecting nodes is used as a voltage applied to a gate of a MOS transistor constituting one of the clock drivers to turn the MOS transistor on.

DETAILED DESCRIPTION OF THE INVENTION

Figure 1:
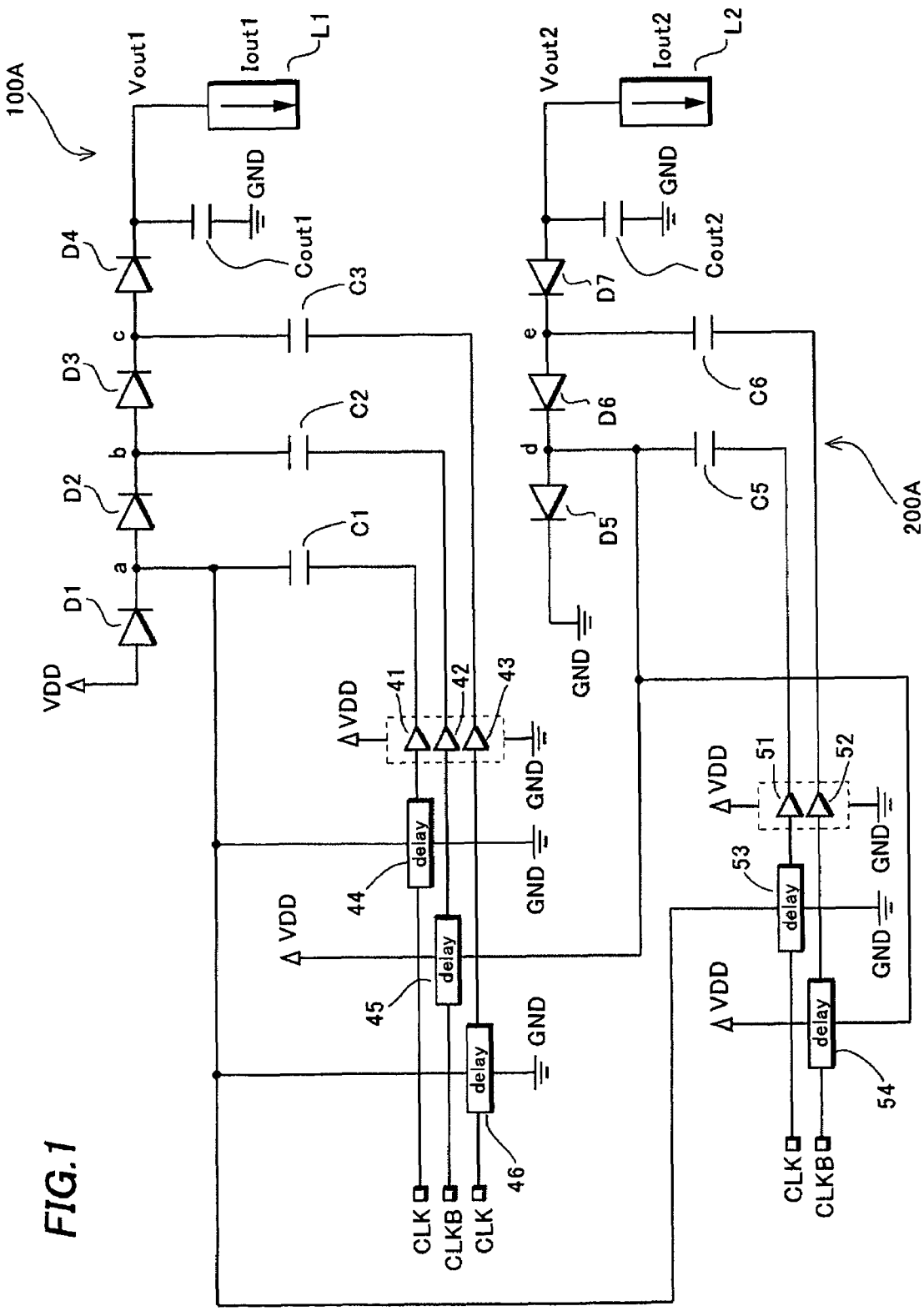
FIG. 1 is a circuit diagram of a charge pump circuit according to a first embodiment of this invention.
Figure 6:
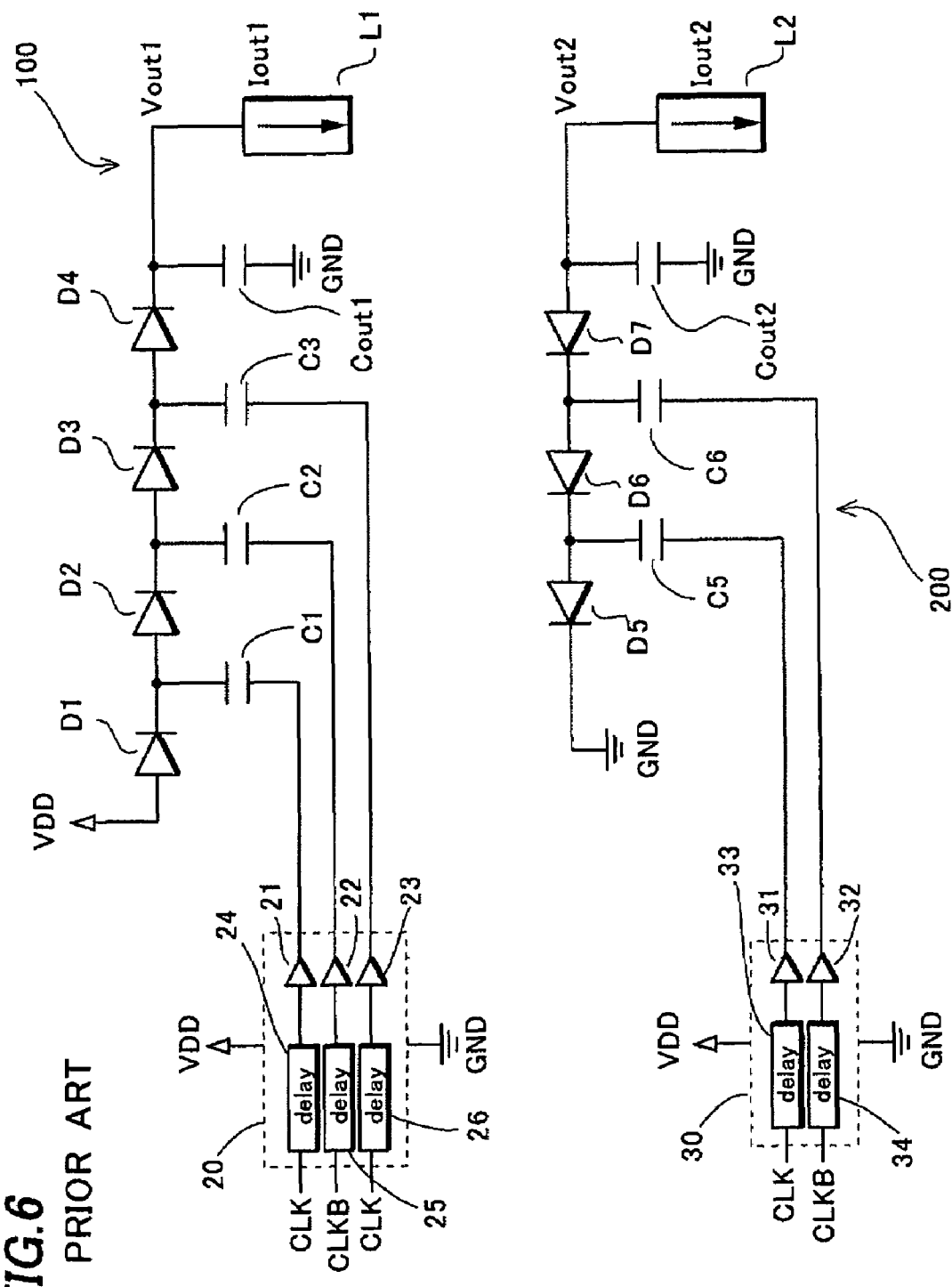
FIG. 6 is a circuit diagram of a charge pump circuit according to a prior art.

Next, a charge pump circuit according to a first embodiment of this invention will be explained hereinafter referring to the drawings. FIG. 1 is a circuit diagram showing the charge pump circuit. The charge pump circuit is composed of a positive booster charge pump circuit 100A and a negative booster charge pump circuit 200A. The same components in FIG. 1 as in FIG. 6 are denoted by the same symbols, and the explanations thereof are omitted.

Figure 3:
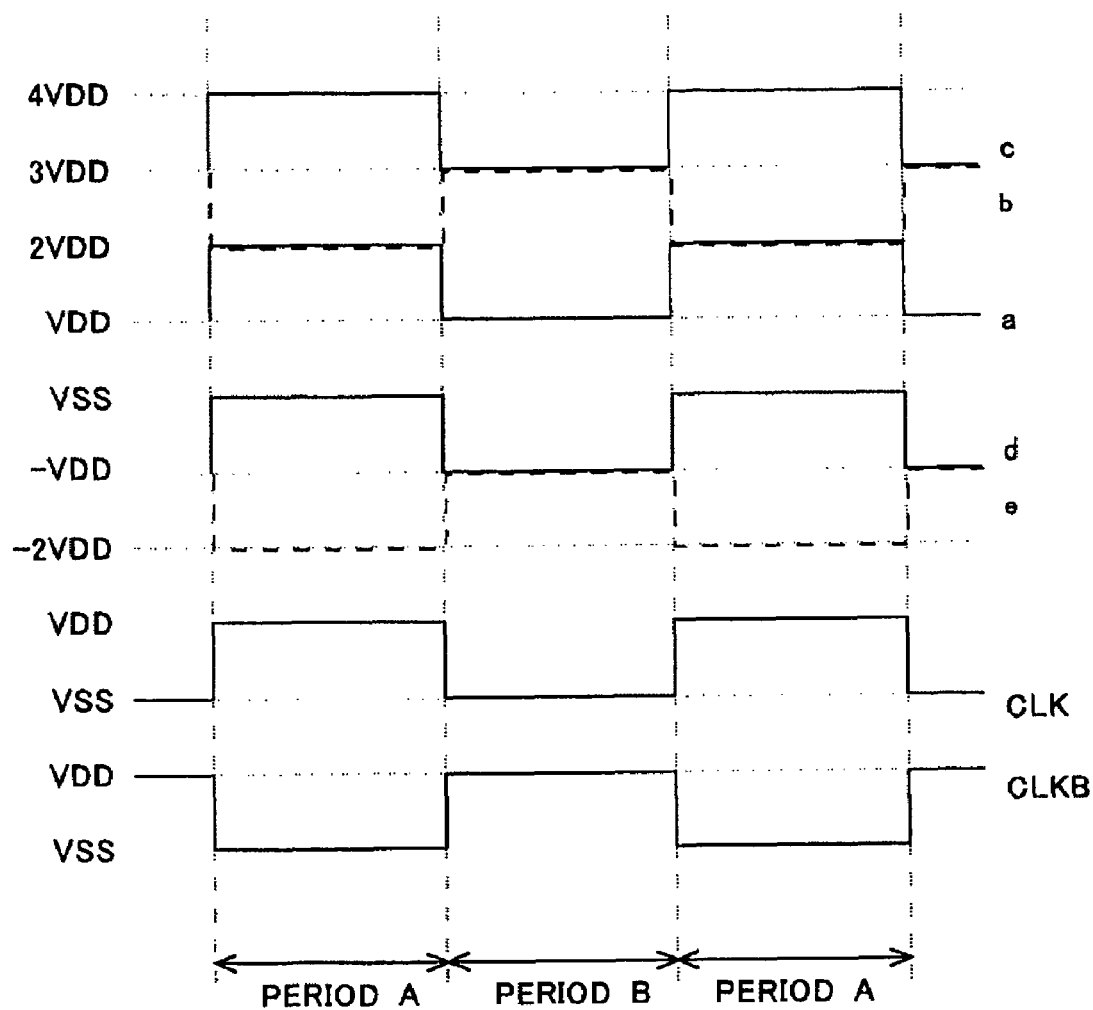
FIG. 3 is an operational waveform chart of the charge pump circuit according to the first embodiment of this invention.

And FIG. 3 is a waveform chart showing voltages at connecting nodes a, b, c, d and e between diodes D1-D7 as shown in FIG. 1 and clocks CLK and CLKB.

Figure 2A:
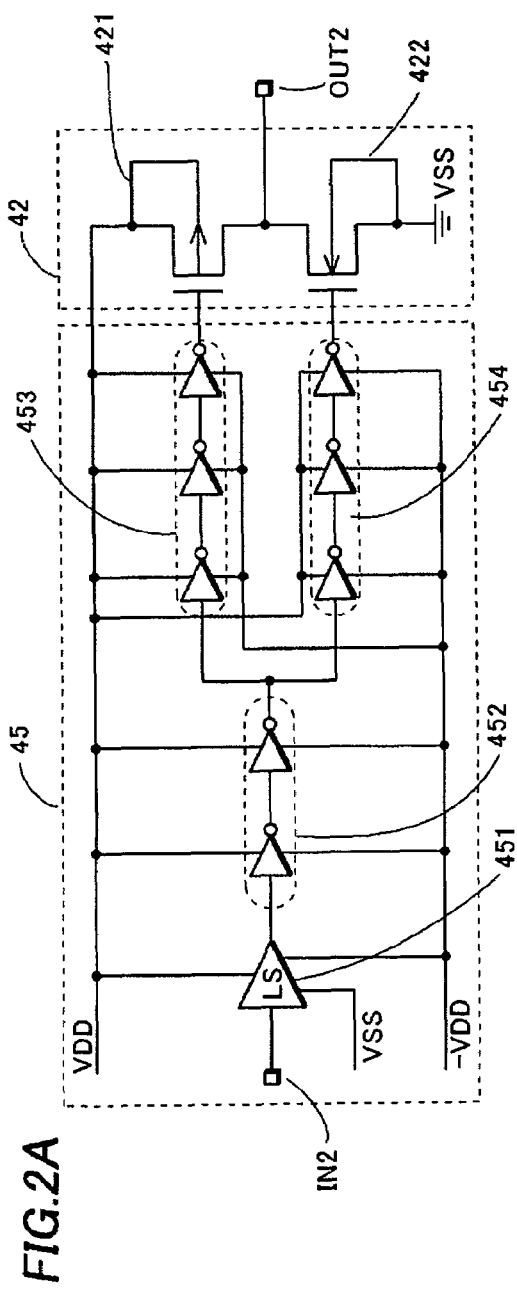
FIGS. 2A and 2B are circuit diagrams of clock drivers and delay circuits used in the charge pump circuit according to the first embodiment of this invention.

FIG. 2A is a circuit diagram showing a second clock driver 42 and a second delay circuit 45. The second clock driver 42 is composed of a P-channel type MOS transistor 421 and an N-channel type MOS transistor 422 connected between a power supply voltage VDD and a ground voltage VSS. A connecting node between the P-channel type MOS transistor 421 and the N-channel type MOS transistor 422 makes an output terminal OUT2.

A high level of the clock CLKB that is inputted to an input terminal IN2 of the second delay circuit 45 is the power supply voltage VDD and a low level of the clock CLKB is the ground voltage VSS. A level shift circuit 451 converts the low level to a negative voltage of −VDD. That is, the low level of an output of the level shift circuit 451 is −VDD, while its high level is VDD. A negative boosted voltage −VDD generated at a first stage node d in the negative booster charge pump circuit 200A during a period B shown in FIG. 3 is supplied to the level shift circuit 451 as a low voltage side power supply voltage.

The output of the level shift circuit 451 is supplied to an inverter chain 452 composed of two inverters connected in series. An output of the inverter chain 452 is further supplied to input terminals of inverter chains 453 and 454. The inverter chains 452, 453 and 454 are provided with a high voltage side power supply voltage of VDD and a low voltage side power supply voltage of −VDD. An output of the inverter chain 453 is applied to a gate of the P-channel type MOS transistor 421, while an output of the inverter chain 454 is applied to a gate of the N-channel type MOS transistor 422.

When the P-channel type MOS transistor 421 is turned on, therefore, a voltage at its gate is −VDD and a voltage VGS between its gate and source is −2VDD, that is twice as high as in the prior art. Since an ON-resistance of the P-channel type MOS transistor 421 is reduced as a result, its size (channel width GW) can be reduced accordingly.

The inverter chain 453 is designed so as to output a low level (−VDD) slower than the inverter chain 454, while the inverter chain 454 is designed so as to output a high level (power supply voltage VDD) slower than the inverter chain 453 on the contrary. Simultaneous turning on of the P-channel type MOS transistor 421 and the N-channel type MOS transistor 422 of the second clock driver 42 and a resulting through-current are prevented from occurring by the design.

Also, a fifth clock driver 52 that outputs a high level voltage during the period B shown in FIG. 3 and a fifth delay circuit 54 are structured in the same way.

Figure 2B:
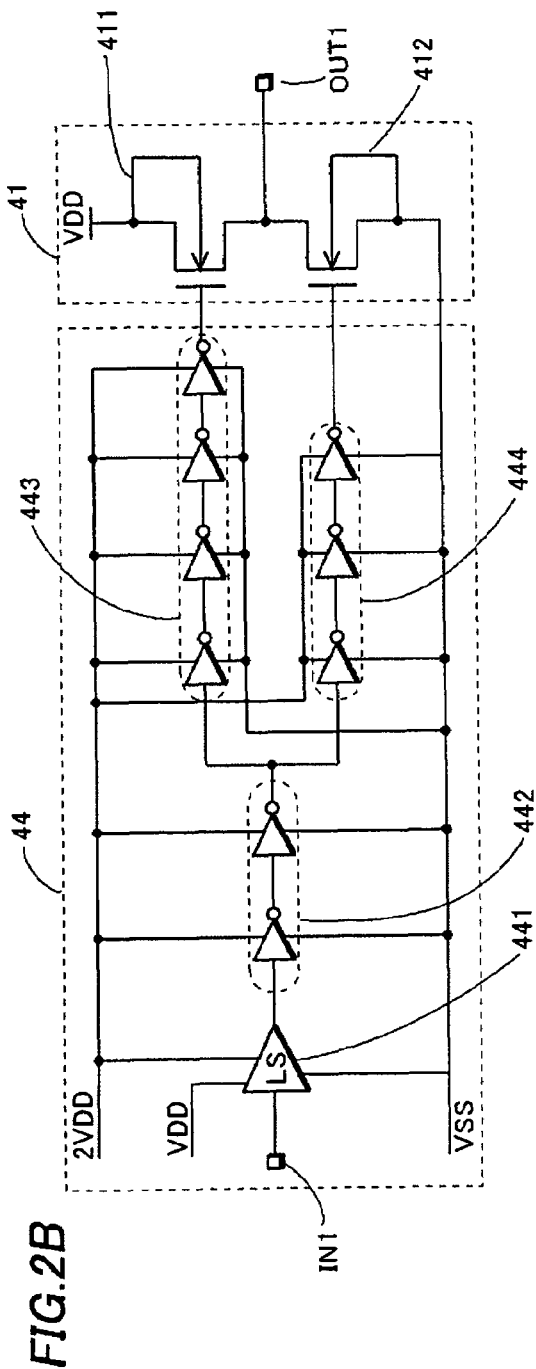

FIG. 2B is a circuit diagram showing a first clock driver 41 and a first delay circuit 44. The first clock driver 41 is composed of an N-channel type MOS transistor 411 and an N-channel type MOS transistor 412 connected between the power supply voltage VDD and the ground voltage VSS. A connecting node between the N-channel type MOS transistor 411 and the N-channel type MOS transistor 412 makes an output terminal OUT1.

A high level of the clock CLK that is inputted to an input terminal IN1 of the first delay circuit 44 is the power supply voltage VDD and a low level of the clock CLK is the ground voltage VSS. A level shift circuit 441 converts the high level to a higher voltage of 2VDD. That is, the high level of an output of the level shift circuit 441 is 2VDD, while its low level is VSS. A positive boosted voltage 2VDD generated at a first stage node a in the positive booster charge pump circuit 100A during a period A shown in FIG. 3 is supplied to the level shift circuit 441 as a high voltage side power supply voltage.

The output of the level shift circuit 441 is supplied to an inverter chain 442 composed of two inverters connected in series. An output of the inverter chain 442 is further supplied to input terminals of inverter chains 443 and 444. The inverter chains 442, 443 and 444 are provided with a high voltage side power supply voltage of 2VDD and a low voltage side power supply voltage of VSS. An output of the inverter chain 443 is applied to a gate of the N-channel type MOS transistor 411, while an output of the inverter chain 444 is applied to a gate of the N-channel type MOS transistor 412.

Figure 7:
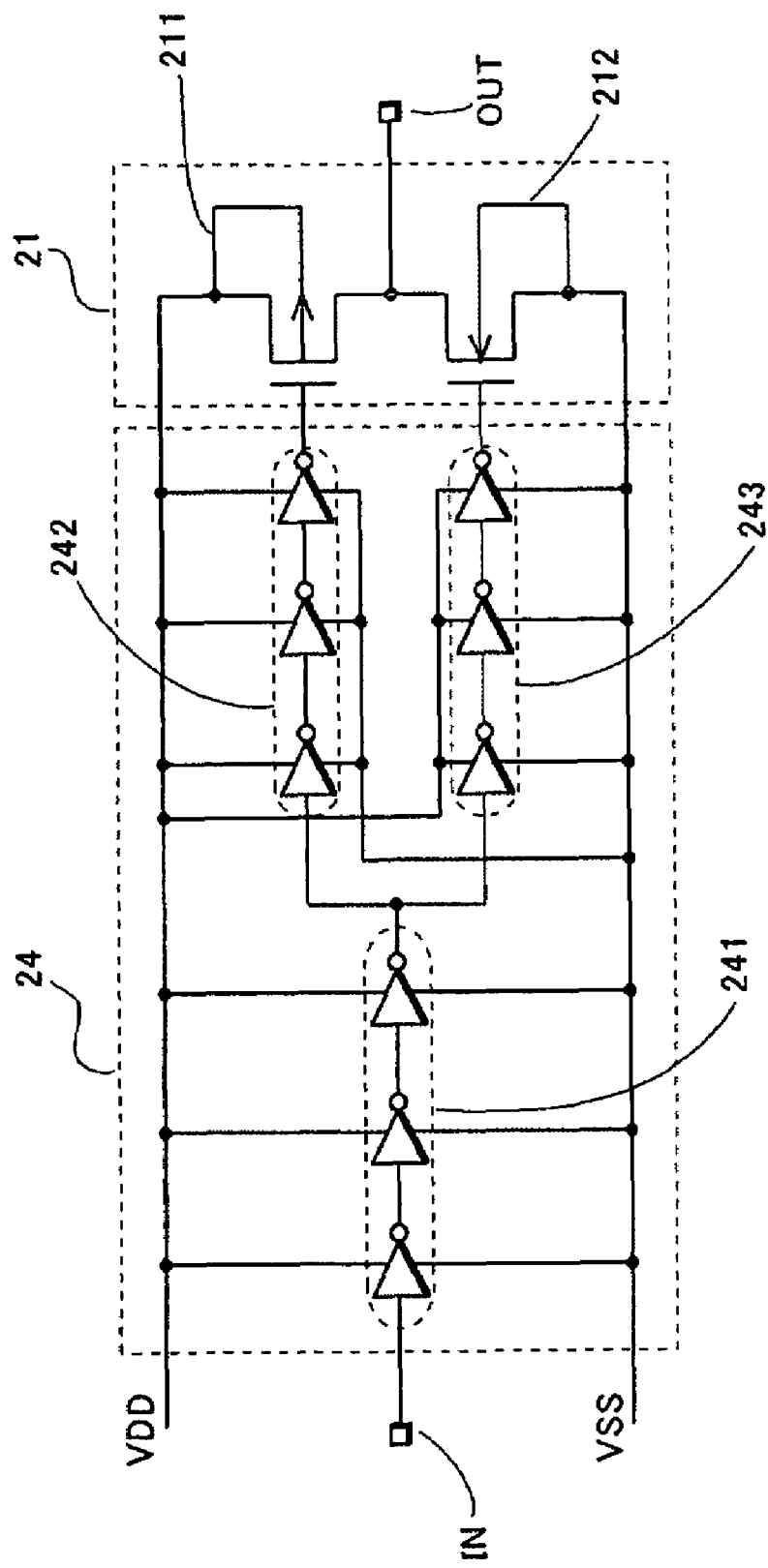
FIG. 7 is a circuit diagram of a clock driver and a delay circuit used in the charge pump circuit according to the prior art.

When the N-channel type MOS transistor 411 is turned on, therefore, a voltage at its gate is 2VDD and a voltage VGS between its gate and source is VDD. In this embodiment, compared with the circuit shown in FIG. 7, the N-channel type MOS transistor 411 shown in FIG. 2B replaces the P-channel type MOS transistor 211, while an absolute value of the voltage VGS between the gate and the source of the N-channel type MOS transistor 411 is the same VDD as that of the P-channel type MOS transistor 211.

However, a lower ON-resistance is available with an N-channel type MOS transistor that generally has higher conductance than a P-channel type MOS transistor. Therefore, the size (channel width GW) of the N-channel type MOS transistor 411 can be reduced compared with the size of the P-channel type MOS transistor 211 shown in FIG. 7.

The inverter chain 443 is designed so as to output the high level (2VDD) slowly, and the inverter chain 444 is also designed so as to output the high level (2VDD) slowly. Simultaneous turning on of the N-channel type MOS transistor 411 and the N-channel type MOS transistor 412 of the first clock driver 41 and resulting through-current are prevented from occurring by the design.

Also, a third clock driver 43 that outputs a high level voltage during the period A shown in FIG. 3 and a third delay circuit 46 are structured in the same way as well as a fourth clock driver 51 and a fourth delay circuit 53.

In the positive booster charge pump circuit 100A in the charge pump circuit of this embodiment, as described above, the positive boosted voltage 2VDD generated at its first stage node a is used as the gate voltage to turn on the MOS transistor (the N-channel type MOS transistor 411, for example) that outputs a high level output of each of the first, third and fourth clock drivers 41, 43 and 51. And in the negative booster charge pump circuit 200A, the negative boosted voltage −VDD generated at its first stage node d is used as the gate voltage to turn on the MOS transistor (the P-channel type MOS transistor 421, for example) that outputs a high level output of each of the second and fifth clock drivers 42 and 52. The sizes of the MOS transistors constituting the clock drivers can be reduced by doing so.

Figure 4:
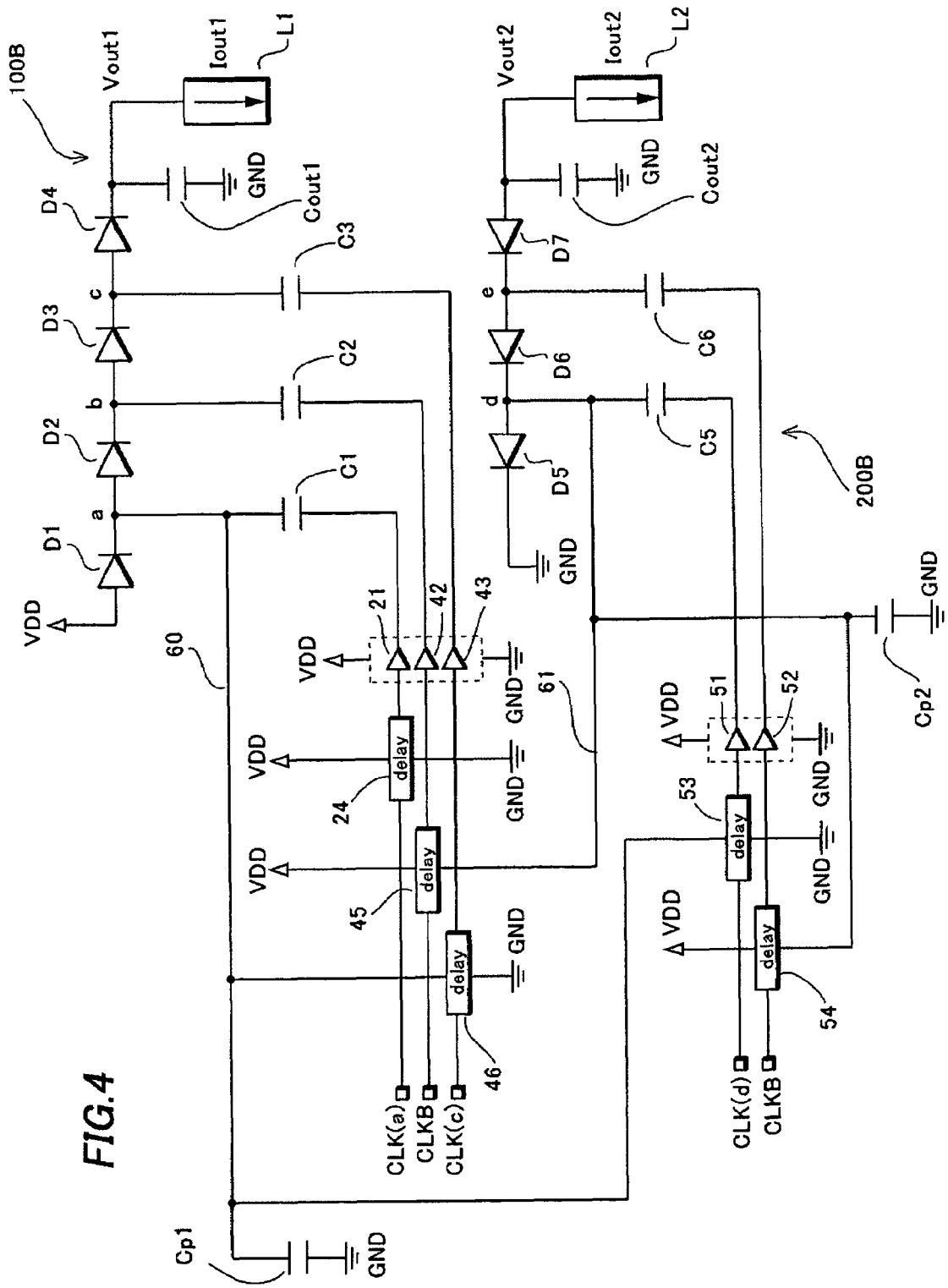
FIG. 4 is a circuit diagram of a charge pump circuit according to a second embodiment of this invention.

Next, a charge pump circuit according to a second embodiment of this invention will be explained hereinafter referring to the drawings. FIG. 4 is a circuit diagram showing a charge pump circuit according to the second embodiment of this invention. The charge pump circuit of the second embodiment differs from that of the first embodiment in that a first clock driver 21 that drives a first stage of the positive booster charge pump circuit 100B and a first delay circuit 24 are the conventional circuits shown in FIG. 7. According to the first embodiment, the first clock driver 41 has to generate the voltage 2VDD by itself at the connecting node a in the positive booster charge pump circuit 100A.

In that case, there might be an unexpected equilibrium in the voltage where the voltage boosting is no longer performed. In order to eliminate such a possibility, the boosted voltage 2VDD is generated stably in the second embodiment by having the first clock driver 21 and the first delay circuit 24 operate under the power supply voltage VDD as in the prior art. Other clock drivers and delay circuits can be also stabilized with this. The rest of the circuit structure is essentially the same as in the fist embodiment.

Also, the second embodiment has particular features in switching timings of the clock drivers. The features are explained hereafter in detail referring to FIG. 5. The voltage at the node a is boosted from VDD to 2VDD by capacitive coupling through a coupling capacitor C1 when the first clock driver 21 in the positive booster charge pump circuit 100B outputs a high level (VDD).

Although the boosted voltage 2VDD generated at the node a is supplied as a high voltage side power supply voltage of the third delay circuit 46 and the fourth delay circuit 53 through a wiring 60, it takes considerable time before the voltage on the wiring 60 reaches 2VDD because the wiring 60 has a large parasitic capacitance CP1.

Figure 5:
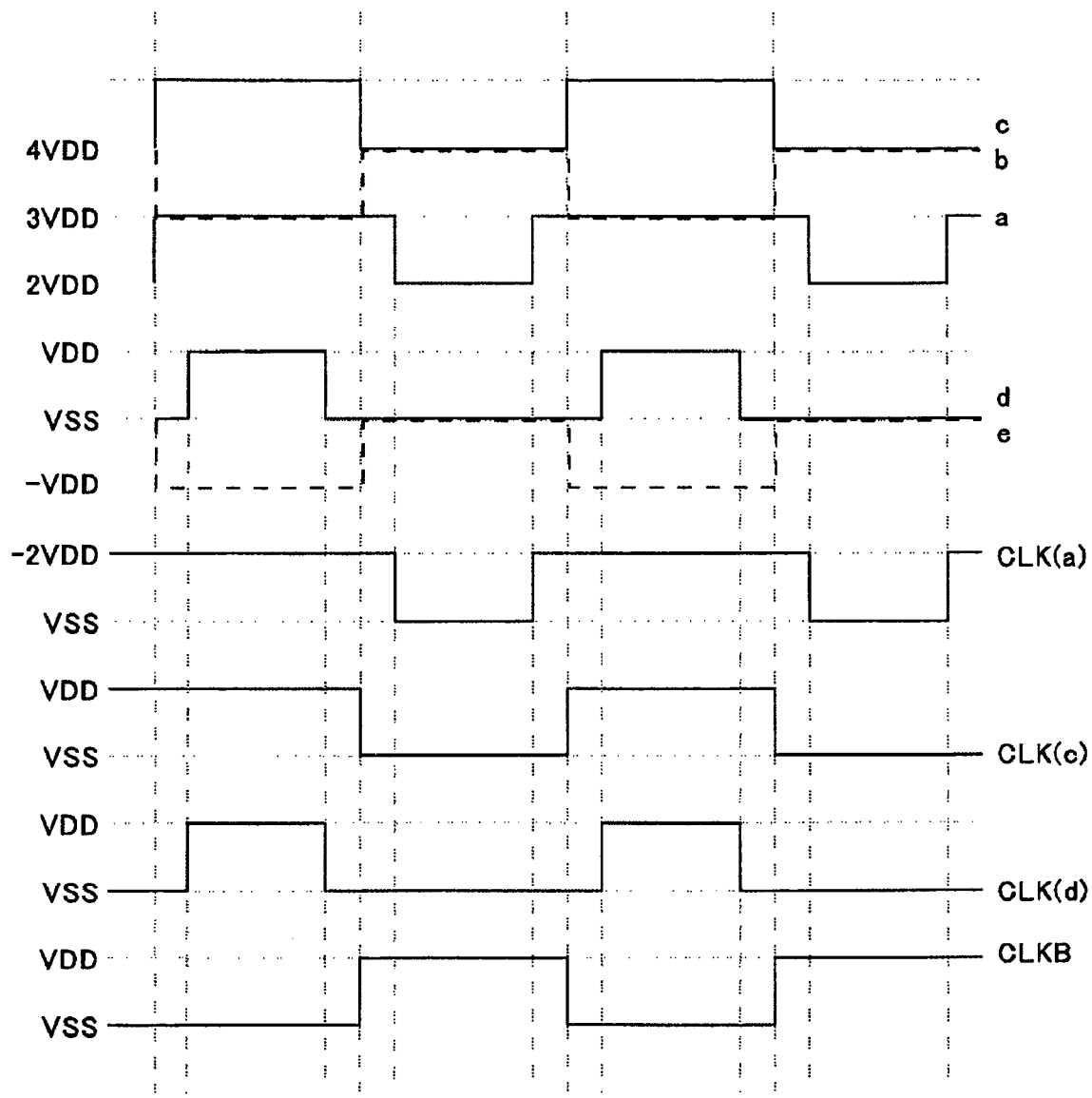
FIG. 5 is an operational waveform chart of the charge pump circuit according to the second embodiment of this invention.

Thus, as shown in FIG. 5, the third clock driver 43 and the fourth clock driver 51 are configured to make switching after the first clock driver 21 outputs the high level (VDD) to boost the voltage at the node a to 2VDD. For that purpose, it is configured that the first clock driver 21 makes switching corresponding to a clock CLK(a), the third clock driver 43 makes switching corresponding to a clock CLK(c) and the fourth clock driver 51 makes switching corresponding to a clock CLK(d). That is, a stable boosting operation is made possible by having the third clock driver 43 and the fourth clock driver 51 make the switching after the high voltage side power supply voltage of the third delay circuit 46 and the fourth delay circuit 53 is stabilized to 2VDD.

Similarly, although the boosted voltage −VDD generated at the node d in the negative booster charge pump circuit 200B is supplied as a low voltage side power supply voltage of the second delay circuit 45 and the fifth delay circuit 54 through a wiring 61, it takes considerable time before the voltage on the wiring 61 reaches −VDD because the wiring 61 has a large parasitic capacitance CP2.

Thus, as shown in FIG. 5, the second clock driver 42 and the fifth clock driver 52 are configured to make switching after the fourth clock driver 51 outputs the low level (VSS) to boost the voltage at the node d to −VDD. For that purpose, it is configured that the fourth clock driver 51 makes switching corresponding to the clock CLK(d), while the second clock driver 42 and the fifth clock driver 52 make switching corresponding to the clock CLKB.

That is, a stable boosting operation is made possible by having the second clock driver 42 and the fifth clock driver 52 make the switching after the low voltage side power supply voltage of the second delay circuit 45 and the fifth delay circuit 54 is stabilized to −VDD.

MOS transistors may be used instead of the diodes D1, D2, D3, D4, D5, D6 and D7 in the first and the second embodiments. In this case, a gate and a source (or a drain) of each of the MOS transistors may be connected with each other. Or a control signal to turn each of the MOS transistors on and off may be applied to its gate.

According to the charge pump circuits of the embodiments, because the boosted voltages are used as the gate voltages to turn on the MOS transistors constituting the clock drivers, the ON-resistances of the MOS transistors can be reduced, making it possible to reduce the cost by reducing the sizes of the MOS transistors accordingly.

What is claimed is:

1. A charge pump circuit comprising:
a first charge pump circuit comprising a plurality of first charge transfer devices connected in series between a node at a power supply voltage and a first output terminal, a plurality of first capacitors, a first terminal of each of the first capacitors being connected to a corresponding connecting node between the first charge transfer devices, and a plurality of first clock drivers that provide second terminals of the first capacitors with clocks so that the second terminals next to each other are provided with the clocks opposite in phase to each other; and
a second charge pump circuit comprising a plurality of second charge transfer devices connected in series between a node at a ground voltage and a second output terminal, a plurality of second capacitors, a first terminal of each of the second capacitors being connected to a corresponding connecting node between the second charge transfer devices, and a plurality of second clock drivers that provide second terminals of the second capacitors with clocks so that the second terminals next to each other are provided with the clocks opposite in phase to each other,
wherein a positive boosted voltage generated at one of the connecting nodes between the first charge transfer devices is applied to a gate of a first MOS transistor of one of the second clock drivers to turn the first MOS transistor on so that the one of the second clock drivers outputs a high level during a first period.

2. The charge pump circuit of claim 1, wherein a negative boosted voltage generated at one of the connecting nodes between the second charge transfer devices is applied to a gate of a second MOS transistor of one of the first clock drivers to turn the second MOS transistor on so that the one of the first clock drivers outputs a high level during a second period.

3. The charge pump circuit of claim 2, wherein the first MOS transistor is N-channel type and the second MOS transistor is P-channel type.

4. The charge pump circuit of claim 2, wherein the positive boosted voltage is twice as high as the power supply voltage and the negative boosted voltage is lower than the ground voltage by the power supply voltage.

5. The charge pump circuit of claim 1, wherein the first and second charge transfer devices comprise diodes or MOS transistors.

6. A charge pump circuit comprising:
   a first charge pump circuit comprising a plurality of first charge transfer devices connected in series between a node at a power supply voltage and a first output terminal, a plurality of first capacitors, a first terminal of each of the first capacitors being connected to a corresponding connecting node between the first charge transfer devices, and a plurality of first clock drivers that provide second terminals of the first capacitors with clocks so that the second terminals next to each other are provided with the clocks opposite in phase to each other; and
   a second charge pump circuit comprising a plurality of second charge transfer devices connected in series between a node at a ground voltage and a second output terminal, a plurality of second capacitors, a first terminal of each of the second capacitors being connected to a corresponding connecting node between the second charge transfer devices, and a plurality of second clock drivers that provide second terminals of the second capacitors with clocks so that the second terminals next to each other are provided with the clocks opposite in phase to each other,
   wherein a negative boosted voltage generated at one of the connecting nodes between the second charge transfer devices is applied to a gate of a MOS transistor of one of the first clock drivers to turn the MOS transistor on so that the one of the first clock drivers outputs a high level.

* * * * *